United States Patent [19]
Friedman et al.

[11] 3,830,490
[45] Aug. 20, 1974

[54] PACKED EXPANSION JOINT

[75] Inventors: George Friedman, Clark; Harold B. Kohn, Cedar Grove; Philip A. Weiner, Rockaway, all of N.J.

[73] Assignee: The Lummus Company, Bloomfield, N.J.

[22] Filed: Nov. 17, 1972

[21] Appl. No.: 307,454

[52] U.S. Cl................. 277/102, 220/46 R, 285/187
[51] Int. Cl............................................. F16j 15/22
[58] Field of Search........................... 285/187, 302; 277/102–124, 58; 220/46

[56] References Cited
UNITED STATES PATENTS
2,379,648   7/1945   Myers.................................. 277/58
2,576,631   11/1951  Mueller et al. ....................... 277/58
FOREIGN PATENTS OR APPLICATIONS
1,167   1/1915   Great Britain...................... 277/105

Primary Examiner—Louis R. Prince
Assistant Examiner—Robert I. Smith
Attorney, Agent, or Firm—Richard J. Holton; Joel G. Ackerman

[57] ABSTRACT

In a system where temperature changes are great, the equipment parts in contact are protected by expansion joints. A simple and economical packing of rope can be used where a minute amount of fluid communication is tolerable and where pressure differential is low. It can be typically applied in shell and tube exchangers and in process equipment which integrates several steps such as a reactor-exchanger combination. The packed expansion joint can also be used for multiple walls in contact, with layers of rope between walls.

9 Claims, 4 Drawing Figures

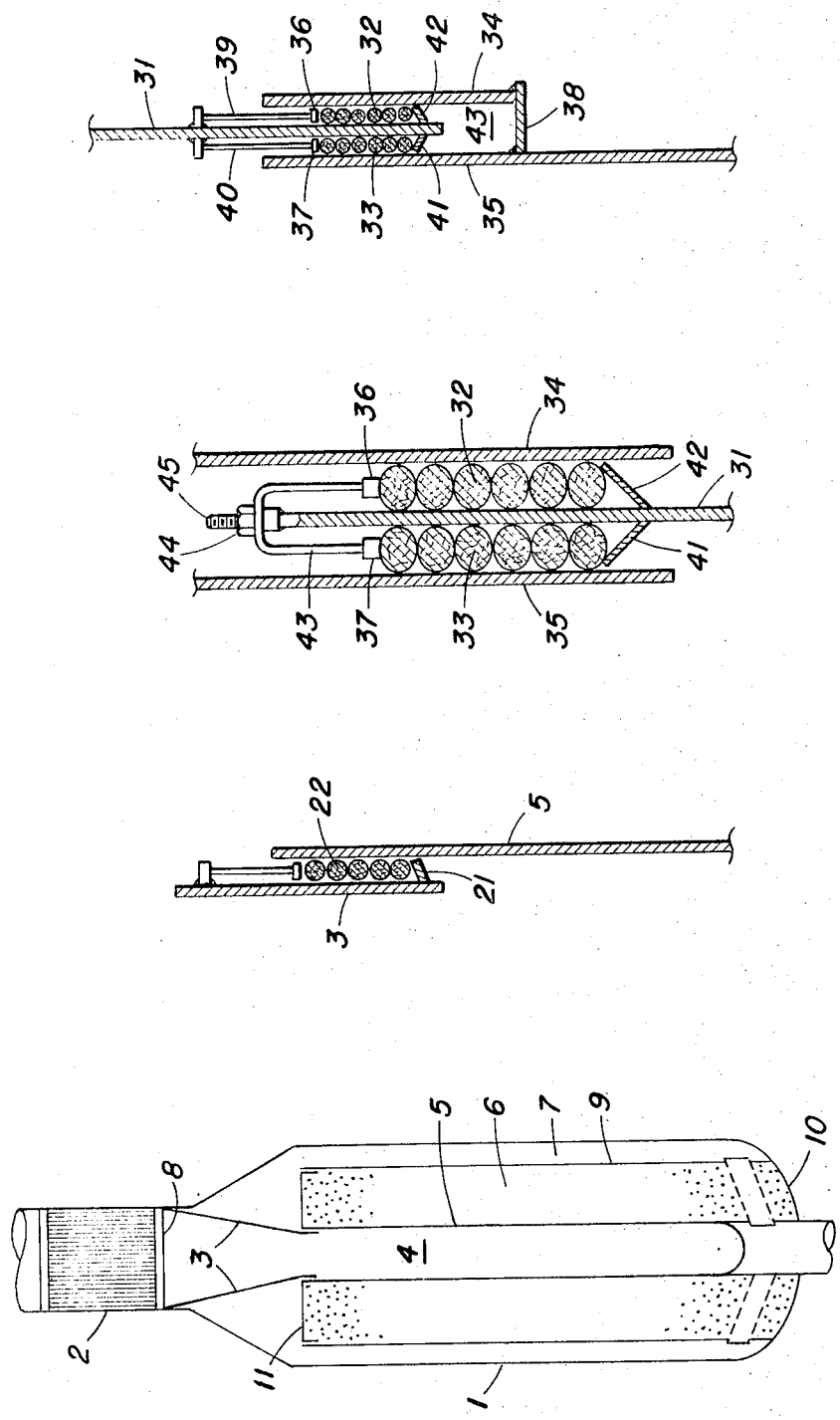

PACKED EXPANSION JOINT

BACKGROUND

It is known in the art that in a vessel where severe temperature changes between components are involved, an expansion joint is usually provided to allow thermal expansion of each component to move freely and independently. The amount of expansion or contraction depends on linear dimension, the material of construction and on differential temperature. Conventionally, two kinds of expansion joints are used, a sealed bellows or a machined packing system. A packed expansion joint has two functions: One is to allow two adjacent metal parts to expand or contract freely; the other is to separate chambers.

Machine-packed joints are mostly used for processes under high pressure differential, such as in stuffing boxes of piston-rods or floating head tube and shell heat exchanger. The packing requires rigorous compression and perfect sealing. Here the packing of stuffing boxes is used to seal off fluid leak and also provides a lubricating surface for the fast moving piston. Packing in floating head type heat exchangers, not only serves as a seal but also allows the floating tube sheet to expand. Under high differential pressure conditions, the sealing of the one chamber from the other becomes essential. Another type of expansion joint is a bellows joint which has been used for fermentators and gas storage tanks. The metal bellows joint needs precise adjustment and costly fabrication; especially so for large vessels, because the expansion effect is both linear and radial.

Our invention relates to a packed expansion joint especially adaptable for a large system wherein a low pressure differential and high temperature differential occur between chambers. Components of elevated pressure systems can be arranged so that the joint is internal and not exposed to the external environment. The joint may be used externally if the fluids involved are non-hazardous and non-polluting.

The object of the invention is to provide a simple, easily replaceable packed joint in a system where the interchamber pressure differential is low and a minimal mixing of streams is tolerable.

Another object is to provide an easily installed joint to obviate elaborate fabrication of expansion joints and precise fitting or adjustment.

A further purpose is to effect a seal between adjacent surfaces to exclude fluid communication between two chambers confined by the surfaces.

A fuller understanding of the invention may be had by referring to the following description and the claims, in conjunction with the drawings.

SUMMARY OF THE INVENTION

A packed joint comprises the following:
a. a first wall;
b. a second wall adjacent to the first wall;
c. a supporting plate connected to one of the walls and extending towards the other wall, thereby forming an open channel;
d. packing means disposed in the channel so that the packing means is confined between the first and second walls, and
e. means for retaining the packing means in the open channel under compression.

BRIEF DESCRIPTION OF THE DRAWING

In the drawings we have chosen to illustrate only a few of the numerous embodiments in which our invention may appear, choosing the forms shown from the point of view of satisfactory illustration, convenient construction and simple exemplification of the idea of the invention.

FIG. 1 is an axial section of a reaction chamber.

FIG. 2 is a detailed cross-sectional view of a single packed expansion joint.

FIG. 3 is a detailed cross-sectional view of a double packed joint.

FIG. 4 is another detailed cross-sectional view of a double packed joint.

DETAILED DESCRIPTION OF THE INVENTION

For the purpose of illustration the following description refers to a general case pertaining to a circular vessel containing a concentric annular chamber. This is not to limit the invention only to such application nor to limit to the configurations of the vessel and chambers. The vessels and chambers can be cubic, conical, spherical or eliptical arranged concentrically, or adjacent with each other. A chamber is formed by a continuous surface. This can be for example a pipe joint, gas storage tank, reactor with interconnecting chambers or heat exchanger.

Referring to FIG. 1, a reactor having a cooled shell (1), is integrated concentrically with a heat exchanger (2) on the top. The feed gas is heated in passing through the heat exchanger tubes. A conical continuous wall (3) connected to the heat exchanger at tube sheet (8) extends to a circular space (4) formed by the wall (5) of an annular chamber (6). The annular chamber is filled with catalyst or other chemical as dictated by process condition and has multiple perforations on the inner and outer walls. The gas is allowed to pass from the inner circular space (4) to an outer annular space (7) formed by wall (9) and shell (1), through the annular chamber (6). Walls (5) (9) are fixed to reactor bottom head (10). There are temperature differentials between walls (1) (9) (3) (5).

The lower part of the conical wall (3) in extending into the central circular space (4) separates the inner chamber from the outer annular space. The conical wall is slideable relative to the upper end of the wall (5) of the annular chamber to allow free movement of the extending wall (3). This is to accommodate the expansion of wall (5) relative to wall (3) and shell (1). Similarly, cylindrical wall (9) is slideable relative to annular cover plate (11). Within the overlapped extension, there is a predetermined gap between the slideable walls. As shown in FIG. 2, an annular supporting plate (21) of a width narrower than the gap allowed but sufficiently wide to hold a layer of rope ring (22) is installed along the periphery of the cylindrical extension of conical wall (3) within the gap. Alternatively, the plate can be installed on the outer surface of the wall (5) of the annular chamber. The plate can be welded on either wall between the gap perpendicular or at an acute angle to the wall. Preferably it is formed of a metal having some flexibility, so that when the wall expands non-uniformly in radius, the opposing wall will not be damaged by the rigid plate. A cross-sectional view of the plate and the adjacent walls form a U-shaped open channel. It is to be noted that the bottom of the U- channel is not closed. The bottom can be attached to the wall at an acute angle or perpendicular.

The depth and width of the packed joint are predetermined. For large vessels, the expansion can be linear as well as radial. For example, in an 18 foot diameter and 90 foot long inner chamber, the linear expansion is on the order of 10 inches at about 1,200°F. The packing material can be of any commercially available heat-resistant inert material such as a ceramic fiber rope consisting of high strength aluminum silicate, rock wool or asbestos. The packing can be twisted in the shape of a rope and can be encased in mesh wire for easy handling. Each rope forms a ring; the number of layers of rope used depends on the tightness desired which in turn depends on the pressure differential of the system. The top row is covered with annular retaining plates in segmented sections or as a continuous ring depending on the convenience of handling. Hold down devices such as wedges, bolts or clamps are adequate to hold the plate at designated points. Hand-tightened pressure on the plate is sufficient to compress the rope to fill up the gap. Hand compressed packing has the ability to expand and refill the available gaps if further compressed during the operation and released.

The layers of rope also absorb the irregularity of bulges which may occur due to releasing of radial stress of the surfaces.

Another embodiment of the invention is a double packed joint as shown in FIG. 3. Briefly, the joint is formed by three walls with the center wall (31) sandwiched by two rows of rope (32,33) in layers. The remaining two walls form the outer walls (34,35) of two separate open channels with the corresponding plates (41,42) but sharing a common middle wall (31). Each of the three walls has one end stationary and the other end remains free to expand. Thus all three walls can move independently.

Two retaining plates (36,37) either in the form of a continuous ring or segments can be used to hold the rope in place. An inverted U-shaped member (43) is connected to threaded rod (45) welded on top of the middle wall with each leg holding one retaining plate under hand-tightened pressure. A nut (44) is used to lock the U-shaped member in place. The hold down device need only be placed two for each segment or three to six for a continuous plate depending on the radius of the plate. Many other hold down devices other than the one shown can be used.

Alternatively, the middle wall can be a wall (31) not forming part of a chamber enclosure but built into the vessel specifically to serve as a partition for the two rows of packing. As shown in FIG. 4, the structure is similar to FIG. 3. A bottom member (38) joining the outer walls forms an enclosure (43) to contain both packing. In this embodiment the outer walls move jointly relative to the middle wall. The hold down device has to be different from that of FIG. 3. Wedges, individual bolts or other similar means can be used. However, each hold down means and the corresponding supporting plate for each row of the rope packing must be attached on the same wall. In this configuration, purge gas may be introduced through bottom plate (38).

The choice of either a single or double joint is a matter of engineering preference. The double packed joints according to the invention were installed in a large vessel containing multiple chambers. A double row of six layers of 1 inch diameter twisted rope were used and compressed to a height of 5 ⅜ inches. The system operated under 3 psi differential pressure. No leak was detected.

We claim:

1. A packed expansion joint between two relatively movable walls of a vessel, said relatively movable walls extending toward each other with a space between them sufficiently large to provide said expansion joint which comprises
   a. a first wall;
   b. a second wall adjacent to the first wall;
   c. a first supporting plate connected to one of the walls and extending towards the other wall thereby forming a first open channel;
   d. first fibrous packing means disposed in the first channel so that the first fibrous packing means is confined between the first and second walls, and
   e. first means for retaining the first packing means in the first open channel under compression.

2. A packed joint according to claim 1 additionally comprising:
   f. a third wall adjacent to the second wall;
   g. a second supporting plate connected to one of the second and third walls and extending towards the other wall forming a second open channel;
   h. second packing means disposed in the second open channel so that the second packing means is confined between the second and third walls, and
   i. second means for retaining the second packing means in the second open channel under compression.

3. A packed joint according to claim 2 further comprising a member joining the first wall and third wall so that the second wall moves relatively to the first and third walls.

4. A packed joint according to claim 1 wherein the first open channel is of an annular shape and the first packing means is a rope ring made of ceramic fiber.

5. A packed joint according to claim 1 wherein the first supporting plate is connected to one of the walls at an acute angle and made of flexible metal.

6. A packed joint according to claim 1 wherein the first retaining means comprises bolts, nut, and plate.

7. A packed joint according to claim 1 wherein the first retaining means comprises wedge and plate.

8. A packed joint according to claim 1 wherein both walls are expandable.

9. A packed joint according to claim 1 wherein one wall is stationary and the other wall is free to expand.

* * * * *